United States Patent
Twining et al.

(10) Patent No.: US 10,705,541 B2
(45) Date of Patent: Jul. 7, 2020

(54) UNMANNED AIRCRAFT NAVIGATION SYSTEM AND METHOD

(71) Applicant: PLANCK AEROSYSTEMS INC., San Diego, CA (US)

(72) Inventors: David Merrick Twining, San Diego, CA (US); Joshua Wells, San Diego, CA (US)

(73) Assignee: PLANCK AEROSYSTEMS INC., San Diego, CA (US)

( * ) Notice: Subject to any disclaimer, the term of this patent is extended or adjusted under 35 U.S.C. 154(b) by 0 days.

(21) Appl. No.: 15/561,400

(22) PCT Filed: Mar. 25, 2016

(86) PCT No.: PCT/US2016/024347
§ 371 (c)(1),
(2) Date: Sep. 25, 2017

(87) PCT Pub. No.: WO2016/204843
PCT Pub. Date: Dec. 22, 2016

(65) Prior Publication Data
US 2018/0173245 A1    Jun. 21, 2018

Related U.S. Application Data

(60) Provisional application No. 62/139,625, filed on Mar. 27, 2015.

(51) Int. Cl.
*G05D 1/06* (2006.01)
*B64D 45/00* (2006.01)
(Continued)

(52) U.S. Cl.
CPC ......... *G05D 1/0684* (2013.01); *B64C 39/024* (2013.01); *B64D 45/00* (2013.01);
(Continued)

(58) Field of Classification Search
CPC ....... G05D 1/0684; G01C 21/20; B64D 45/00
See application file for complete search history.

(56) References Cited

U.S. PATENT DOCUMENTS 6,064,924 A * 5/2000 Fleischmann .......... G01S 7/411
701/16
2006/0058928 A1    3/2006 Beard et al.
(Continued)

FOREIGN PATENT DOCUMENTS

EP            3274256 A2     1/2018
WO    WO-2006132713 A2    12/2006
(Continued)

OTHER PUBLICATIONS

PCT/US2018/038330 International Search Report and Written Opinion dated Sep. 18, 2018.
(Continued)

*Primary Examiner* — Donald J Wallace
(74) *Attorney, Agent, or Firm* — Wilson Sonsini Goodrich & Rosati

(57) ABSTRACT

Systems, apparatuses and methods for landing an unmanned aircraft on a mobile structure are presented. Sensors on the aircraft identify a predetermined landing area on a mobile structure. The aircraft monitors the sensor data to maintain its position hovering over the landing area. The aircraft estimates a future attitude of the surface of the landing area and determines a landing time that corresponds to a desired attitude of the surface of the landing area. The unmanned aircraft executes a landing maneuver to bring the aircraft into contact with the surface of the landing area at the determined landing time.

28 Claims, 5 Drawing Sheets

(51) Int. Cl.
*G01C 21/20* (2006.01)
*B64C 39/02* (2006.01)
*B64D 45/04* (2006.01)
*B64F 1/12* (2006.01)

(52) U.S. Cl.
CPC .............. *B64D 45/04* (2013.01); *B64F 1/12* (2013.01); *G01C 21/20* (2013.01); *G05D 1/0669* (2013.01); *B64C 2201/027* (2013.01); *B64C 2201/108* (2013.01); *B64C 2201/141* (2013.01); *B64C 2201/18* (2013.01); *B64C 2201/205* (2013.01); *B64C 2201/206* (2013.01); *B64C 2201/208* (2013.01)

(56) References Cited

U.S. PATENT DOCUMENTS

| | | | |
|---|---|---|---|
| 2011/0202209 A1* | 8/2011 | Moresve | G05D 1/0684 701/15 |
| 2011/0307126 A1* | 12/2011 | Hogstrom | G01S 17/933 701/16 |
| 2012/0076397 A1* | 3/2012 | Moresve | B64F 1/20 382/153 |
| 2014/0222246 A1 | 8/2014 | Mohamadi | |
| 2014/0236390 A1 | 8/2014 | Mohamadi | |
| 2014/0324253 A1 | 10/2014 | Duggan et al. | |
| 2015/0183498 A1 | 7/2015 | Wardle | |
| 2015/0207964 A1 | 7/2015 | Bye et al. | |
| 2015/0277442 A1 | 10/2015 | Ballou | |
| 2015/0353206 A1* | 12/2015 | Wang | B64F 1/00 244/114 R |
| 2015/0370250 A1 | 12/2015 | Bachrach et al. | |
| 2015/0370251 A1* | 12/2015 | Siegel | G05D 1/0027 701/2 |
| 2016/0144734 A1 | 5/2016 | Wang et al. | |
| 2017/0129603 A1 | 5/2017 | Raptopoulos et al. | |
| 2017/0139424 A1* | 5/2017 | Li | G05D 1/0684 |
| 2017/0267374 A1* | 9/2017 | Derenick | G01C 21/00 |

FOREIGN PATENT DOCUMENTS

| | | | |
|---|---|---|---|
| WO | WO-2010071502 A1 * | 6/2010 | ........... G01S 17/933 |
| WO | WO-2015154148 A1 | 10/2015 | |
| WO | WO-2015179797 A1 | 11/2015 | |
| WO | WO-2016204843 A2 | 12/2016 | |
| WO | WO-2017123768 A1 | 7/2017 | |

OTHER PUBLICATIONS

Co-pending U.S. Appl. No. 16/012,498, filed Jun. 19, 2018.
PCT/US2017/013203 International Preliminary Report on Patentability dated Jul. 17, 2018.
PCT/US2017/013203 International Search Report and Written Opinion dated Apr. 25, 2017.
PCT/US2016/024347 International Preliminary Report on Patentability dated Oct. 12, 2017.
PCT/US2016/024347 International Search Report and Written Opinion dated Jan. 10, 2017.

* cited by examiner

UNMANNED AIRCRAFT NAVIGATION SYSTEM AND METHOD

CROSS REFERENCE

This application is a U.S. National Phase of International Application No. PCT/US2016/024347, filed Mar. 25, 2016, which claims priority to U.S. provisional patent application No. 62/139,625 filed Mar. 27, 2015, which is incorporated herein by reference in its entirety.

BACKGROUND

Field of the Invention

The present invention generally relates to unmanned aircraft and more specifically relates to autonomous takeoff and landing of an unmanned aircraft on a mobile structure.

Related Art

Unmanned aircraft were first used in military programs several decades ago. In military applications, unmanned aircraft systems are typically piloted by expertly trained operators under highly controlled conditions. More recently, unmanned aircraft are being used in civilian activities including both commercial and hobbyist activities. Today, multiple commercial uses for unmanned aircraft are being explored, with low levels of success because civilian unmanned aircraft are typically operated in a wide variety of conditions, by people with varying levels of skill. A significant problem for commercial and hobbyist deployment of unmanned aircraft is the difficulty involved in piloting these systems, particularly when unmanned aircraft are being operated in harsh physical environments. A challenge that must be overcome for commercial unmanned aircraft systems to be successful is implementation of the necessary autonomy that is required for an unmanned aircraft to takeoff, fly and land such that skill of the operator is not a factor. Unmanned aircraft crashes must become extremely rare as the cost and complexity of the sensor systems attached to unmanned aircraft continues to increase.

Most recently, during the design and implementation of the current generation of unmanned aircraft, the autonomy necessary to operate drones successfully while flying at altitude has been significantly improved. However, the unmanned aircraft industry still lacks the necessary autonomy for an unmanned aircraft to take off and land repeatedly and successfully without crashing. A significant majority of unmanned aircraft crashes occur during takeoff and landing, which are the most dynamic phases of flight. These crashes are often attributable to human error. In order for unmanned aircraft to be commercially viable, they must be capable of taking off and landing autonomously and without user intervention.

The industry has attempted to address the inability for unmanned aircraft to autonomously take off and land with certain efforts to develop an autonomous takeoff and landing capability for unmanned aircraft. However, these efforts have only been partially successful and completely fail to address the challenges inherent in landing an unmanned aircraft on a structure that is not stationary.

Therefore, what is needed is a system and method that overcomes these significant problems found in the conventional systems as described above.

SUMMARY

As unmanned aircraft continue to get smaller in size, applications in which they are launched and recovered from moving vehicles are commercially desirable and increasingly important. The ability for an unmanned aircraft to autonomously and reliably land on a moving vehicle (e.g., moving on land, water, or in the air) is extremely important to enable potential applications such as maritime security and surveillance, fish spotting, traffic enforcement, and a variety of defense applications, just to name a few. And because the level of difficulty involved in making this type of landing is known to be exceptionally high for a human pilot, autonomous takeoff and landing of an unmanned aircraft on a mobile structure is extremely challenging.

Accordingly, to solve the problems described above and to enable solutions for the highly desirable potential applications, disclosed herein are apparatuses, systems and methods for landing an unmanned aircraft on a mobile structure. In one embodiment, sensors on the approaching aircraft identify a predetermined mobile landing area on a mobile structure. The aircraft processes the sensor data to maintain its position hovering over the mobile landing area. The aircraft estimates a future attitude of the surface of the mobile landing area and determines a landing time that corresponds to a desired attitude of the surface of the mobile landing area. The unmanned aircraft executes a landing maneuver to bring the aircraft into contact with the surface of the mobile landing area at the determined landing time.

In an alternative embodiment, sensors on the mobile structure combine with the sensors on the aircraft to provide additional information to the aircraft to allow the aircraft to approach and identify the mobile landing area. Once the aircraft is hovering over the mobile landing area, it estimates a future attitude of the surface of the mobile landing area determines a landing time that corresponds to a desired attitude of the surface of the mobile landing area. The unmanned aircraft executes a landing maneuver to bring the aircraft into contact with the surface of the mobile landing area at the determined landing time.

Other features and advantages of the present invention will become more readily apparent to those of ordinary skill in the art after reviewing the following detailed description and accompanying drawings.

BRIEF DESCRIPTION OF THE DRAWINGS

The structure and operation of the present invention will be understood from a review of the following detailed description and the accompanying drawings in which like reference numerals refer to like parts and in which.

DETAILED DESCRIPTION

Certain embodiments disclosed herein provide for unmanned aircraft operation from a mobile structure including autonomous take off from the mobile structure and autonomous landing on the mobile structure. For example, one method disclosed herein allows for an unmanned aircraft to approach a mobile structure and identify a predetermined mobile landing area, determine a landing time corresponding to a desired attitude of the surface of the predetermined mobile landing area and then control operation of the lift system of the unmanned aircraft to bring the unmanned aircraft into contact with the surface of the mobile landing area. After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
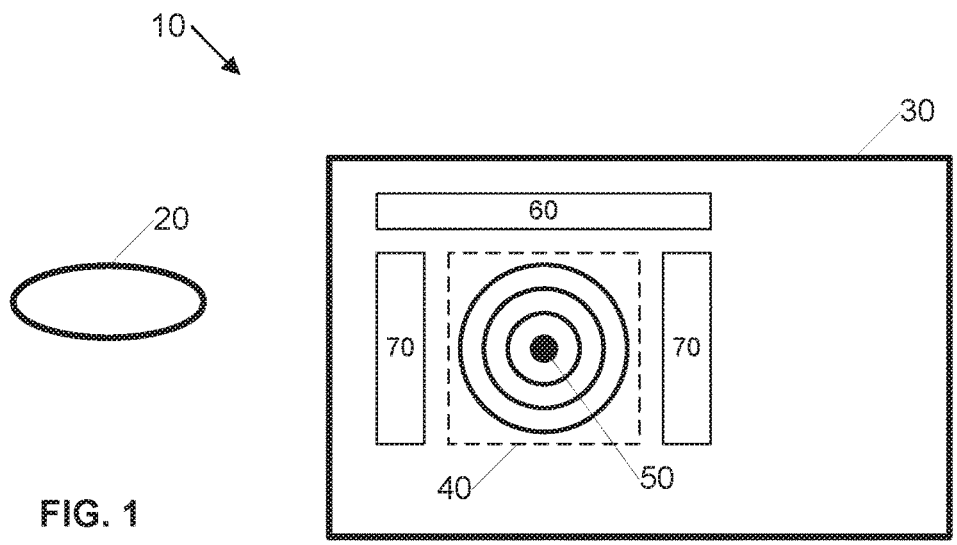
FIG. 1 is a block diagram illustrating an example system for unmanned aircraft navigation according to an embodiment of the invention.

FIG. 1 is a block diagram illustrating an example system 10 for unmanned aircraft navigation according to an embodiment of the invention. In one embodiment, the system 10 includes an unmanned aircraft 20 and a mobile landing area 40. The mobile landing area 40 is placed upon or is part of a mobile structure 30, which may be any sort of mobile structure capable of moving on land, water or in the air. For example, the mobile structure 30 may be a car, a boat or an airplane.

The unmanned aircraft 20 may be any sort of unmanned vehicle capable of flight and capable of sensing information about its environment. In one embodiment, the aircraft 20 may also be capable of wireless communication. In one embodiment, the mobile landing area 40 may include a visual cue such as a target 50. The system 10 may also include a mobile landing structure unit ("MLSU") 60. In one embodiment, the MLSU 60 communicates wirelessly with the aircraft 20 and includes sensors for determining movement of the mobile landing structure 30. The MLSU 60 may also operate a capture mechanism 70 that is configured to secure the aircraft 20 to the mobile landing area 40. The capture mechanism 70 may comprise two separate units (as illustrated) or it may be a single unit or may have more than two units that collectively operate to secure the aircraft 20 to the mobile landing area 40. In one embodiment, the capture mechanism 70 may comprise one or more arms (not shown) that secure a portion of the aircraft 20 to the surface of the mobile landing area 40. For example, an arm of the capture mechanism 70 may secure a foot of the aircraft 20 to the surface of the mobile landing area 40. Alternatively, the capture mechanism 70 may comprise an elevated net (not shown) extending between two or more units of the capture mechanism 70, where the elevated net is designed to arrest the descent of the aircraft 20 above the surface of the mobile landing area 40. The capture mechanism 70 may also be configured to release the aircraft 20 prior to takeoff. Additional embodiments for the capture mechanism 70 may also be employed, as will be understood by the skilled artisan.

In one embodiment, the mobile landing area 40 comprises a separate horizon surface (not shown) that is supported by a horizon mechanism (not shown). The horizon mechanism is in contact with the surface of the mobile structure 30. The horizon mechanism is configured to independently move in order to create a favorable landing attitude for the horizon surface. For example, the horizon surface can be a stabilized platform that maintains a level attitude with respect to the horizon even as the mobile structure 30 pitches, rolls, and yaws beneath it. In this example, the horizon surface maintains level with the horizon because the horizon surface is supported by a gyroscopically stabilized horizon platform. Alternatively, the horizon mechanism may comprise one or more hydraulic actuators or servomechanisms that counteract the roll, pitch and yaw movements of the mobile structure 30 in order to keep the horizon surface level with respect to the horizon. Furthermore, in an alternative embodiment the horizon mechanism may be configured to move in linear motions (forward, backward, side to side, up and down) to counteract the roll, pitch and yaw motions of the mobile structure 30 and ensure a favorable landing attitude for the horizon surface.

In one embodiment, the unmanned aircraft 20 is configured to take off from the mobile landing structure 30 and execute its mission in the air. At an appropriate time, e.g., when the mission is complete, the MLSU 60 communicates with the aircraft 20 to guide aircraft 20 back to the mobile landing structure 30. Alternatively, the aircraft 20 may independently determine the appropriate time to return to the mobile landing structure 30 and guide itself back. The aircraft 20 approaches the mobile landing structure 30 and identifies the mobile landing area 40, for example by visual recognition of the target 50 or visual recognition of an image of the landing area stored in data storage area 140 or received from MLSU 60. The aircraft 20 executes a landing maneuver to bring the aircraft 20 into contact with the surface of the mobile landing area 40 in cooperation with the MLSU 60 that operates the capture mechanism 70 to secure the aircraft 20 to the surface of the mobile landing area 40.

Figure 2A:
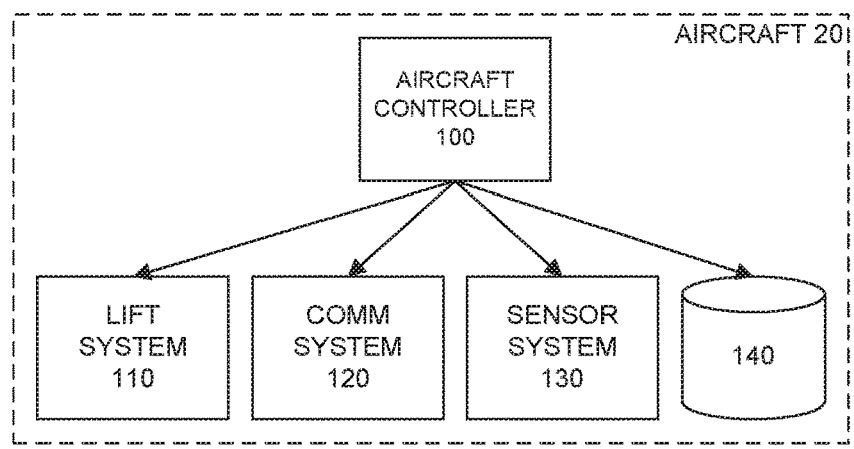
FIG. 2A is a block diagram illustrating an example unmanned aircraft according to an embodiment of the invention.

FIG. 2A is a block diagram illustrating an example unmanned aircraft 20 according to an embodiment of the invention. In the illustrated embodiment, the aircraft 20 comprises an aircraft controller 100, a lift system 110, a communication system 120, a sensor system 130 and a data storage area 140.

The aircraft controller 100 is a processor device that is configured to execute instructions to control operation of the aircraft 20. The instructions may be dynamically received, stored in the data storage area 140 or they may be integral to the controller 100. In operation, the controller 100 is configured to control operation of the lift system 110 for flight, control operation of the communication system 120 for wired or wireless communication between the aircraft and other devices, control operation of the sensor system 130 to receive information about the environment of the aircraft 20 and control operation of the data storage area 140 to access information stored therein and to store information therein.

The lift system 110 is configured to provide the aircraft 20 with the ability to fly by generating lift and propelling the aircraft 20 through three dimensional space. The lift system 110 is configured to move the aircraft 20 through three dimensional space, for example up, down and side-to-side, which in combination allow the aircraft 20 to move through three dimensional space. The lift system 110 is also configured to rotate the aircraft 20 so the aircraft 20 is capable of flight in all directions. The lift system 110 is also configured to hover the aircraft 20 and maintain a fixed position in three dimensional space. In one embodiment, the lift system 110 generates lift by passing air over an airfoil. By generating sufficient lift, the aircraft 20 can ascend. By reducing the lift, the aircraft 20 can descend. The lift system 110 is also configured to communicate with the controller 100 to allow the controller 100 to fly the aircraft 20.

The aircraft communication system 120 is configured to allow wired and wireless communication between the aircraft 20 and other devices. In one embodiment, the aircraft communication system 120 includes one or more antennas, transmitters, receivers, and other equipment necessary for the aircraft 20 to communicate with other devices. For example, during flight, the aircraft 20 can communicate with other devices wirelessly and when not in flight, the communication system 120 may include a physical connection port to allow the communication system 120 to communicate over a wired connection. Advantageously, the communication system 120 is also configured to communicate with the controller 100 to allow the controller 100 to transmit and receive data to and from outside of the aircraft 20.

The sensor system 130 is configured to sense information related to the environment of the aircraft 20. In one embodiment, the sensor system 130 comprises one or more sensors positioned at any location within or on the aircraft 20. For example, the sensors may include one or more of each of optical and infrared cameras, range-finders, inertial measurement units (IMUs), accelerometers, magnetometers, and compasses, just to name a few. Advantageously, the individual sensors may be co-located or dispersed around the aircraft 20. The individual sensors advantageously sense information and may directly store the information as data in the data storage area 140. Additionally, the sensor system 130 is configured to communicate with the controller 100 to allow the controller 100 to operate individual sensors and receive and process sensed information and store the sensed information as data in the data storage area 140. The sensor system 130 is also configured to allow the addition of new sensors and the removal of existing sensors. For example, the sensor system 130 may allow an optical camera to be swapped out for an infrared camera to satisfy the characteristics and/or requirements of the next mission.

Figure 2B:
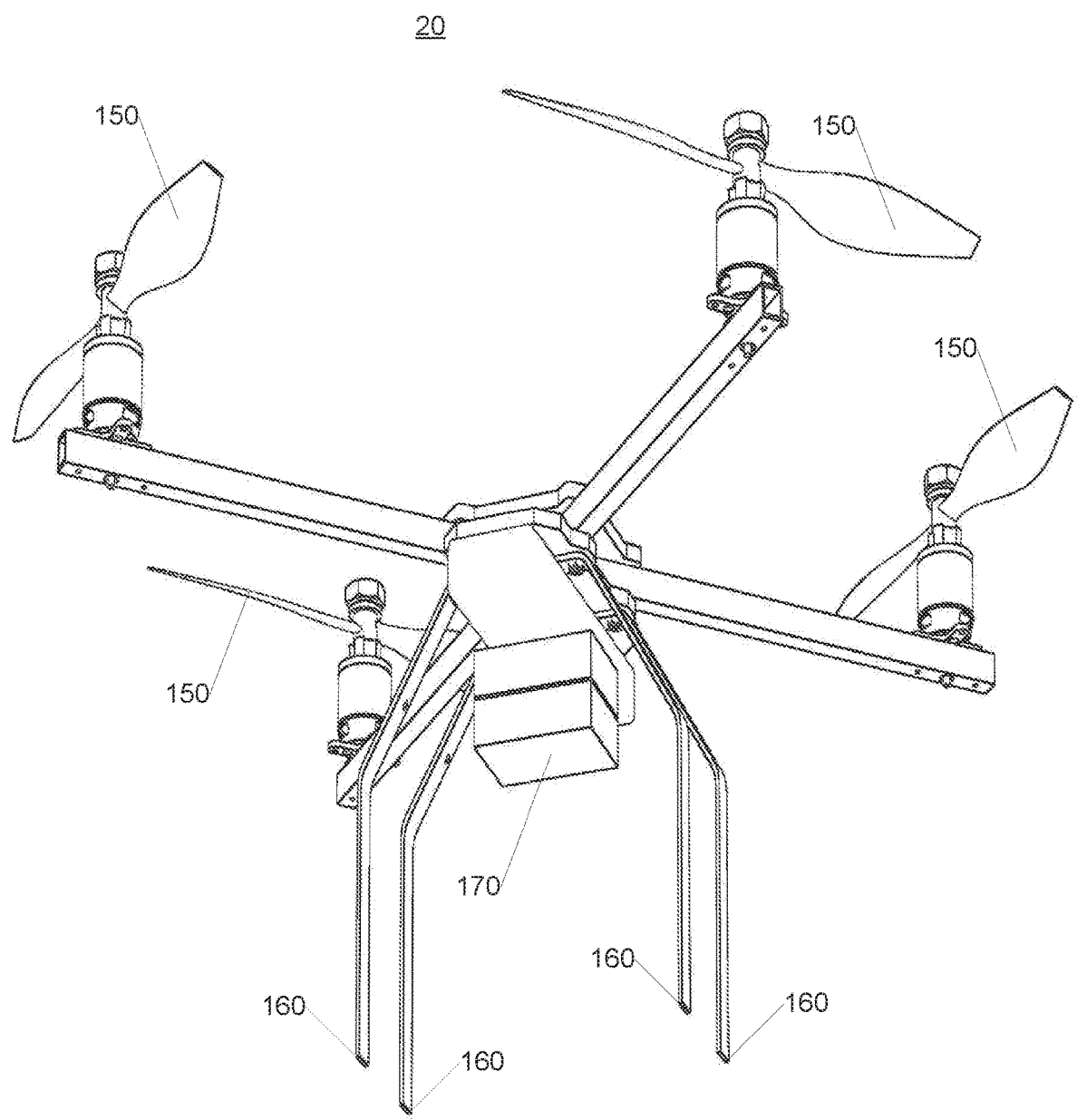
FIG. 2B is a plan view diagram illustrating an example unmanned aircraft according to an embodiment of the invention.

FIG. 2B is a block diagram illustrating an example unmanned aircraft 20 according to an embodiment of the invention. In the illustrated embodiment, the aircraft 20 comprises a plurality of lift mechanisms 150. The plurality of lift mechanisms 150 are part of the lift system 110 previously described with respect to FIG. 2A. In the illustrated embodiment, the aircraft 20 also comprises a plurality of landing feet 160. The plurality of landing feet 160 are part of the chassis and/or housing of the body of the aircraft 20. In the illustrated embodiment, the aircraft 20 also comprises a sensor unit 170. The sensor unit 170 is coupled to the chassis and/or housing of the body of the aircraft 20 and comprises one or more sensors. In the illustrated embodiment, the sensor unit 170 is positioned between the landing feet 160 of the aircraft 20 such that a camera device (not shown) within the sensor unit 170 has a clear view of the previously described mobile landing area 40 of the mobile landing structure 30.

Figure 3:
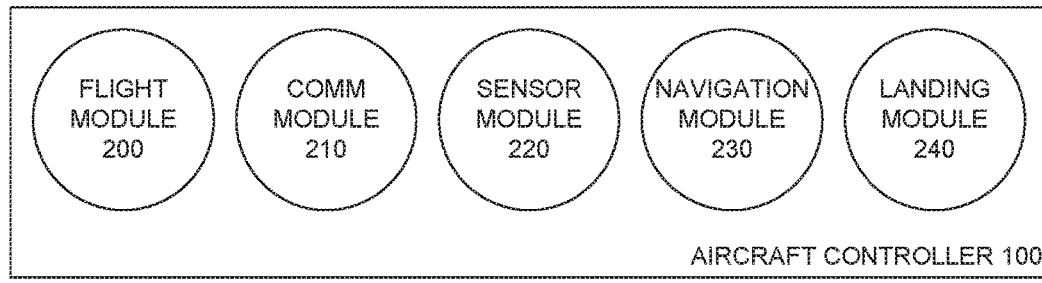
FIG. 3 is a block diagram illustrating an example controller in an unmanned aircraft according to an embodiment of the invention.

FIG. 3 is a block diagram illustrating an example controller 100 in an unmanned aircraft according to an embodiment of the invention. In the illustrated embodiment, the controller 100 comprises a flight module 200, a communication module 210, a sensor module 220, a navigation module 230 and a landing module 240. As previously described, the controller 100 is configured to store data in and obtain data from the data storage area 140. In various embodiments, the illustrated modules 200-240 can be implemented entirely in software or may be implemented entirely in hardware or may be implemented in a combination of hardware and software.

The flight module 200 is configured to fly the aircraft 20. The flight module 200 is configured to perform all processes, perform all calculations, and execute all algorithms to ensure reliable flight of the aircraft 20. The flight module 20 may also be referred to herein as a flight controller, autopilot, or inner-loop control. The flight module 20 is configured to translate inputs from the aircraft controller 100 to the appropriate outputs to the previously described lift system 110. For example, if the aircraft 20 needs to descend at a steady rate, the flight module 200 determines how much to adjust the power being delivered to each lift mechanism 150 in order to execute that descent.

The communication module 210 is configured to control and operate the various components of the communication system 120. The communication module 210 is configured to send data to the communication system 120 and is also configured to receive data from the communication system 120 and store data in the data storage area 140. The communication module 210 is also configured to process the received data directly or route the received data to an alternative module for processing or storing in the data storage are 140. The communication module 210 is also configured to manipulate and package data, commands, and telemetry information so that such data, commands, and information is suitable to be transmitted or received or routed to another module. For example, the communication module 210 may turn on the telemetry radio and transmit a request to the MLSU 60. In this example, the request is a request for the Global Navigation Satellite System ("GNSS") coordinates or the Global Positioning System ("GPS") coordinates of the MLSU 60. As will be understood by the skilled artisan, GPS is a subset of GNSS. The communication module 210 is further configured to receive the requested coordinates from the MLSU 60, format the coordinates, store the coordinates in data storage area 140 and then place the telemetry radio in standby mode.

The sensor module 220 is configured to operate the sensor system 130. In one embodiment, the sensor module 220 is configured to receive data generated from information sensed by the individual sensors of the sensor system 130.

Additionally, the sensor module 220 is configured to process the received data, manipulate the data, reformat the data, perform calculations using the data, and store the data and/or results of calculations on the data in the data storage area 140. The sensor module 220 is also configured to make the data available to other modules and systems as necessary, for example via the data storage area 140 or directly via data transfer from the sensor module 220 to the recipient module. The sensor module 220 is also configured to control the operation of the sensors, including adjusting the state of an individual sensor, for example by turning an individual sensor on or off, or by changing the function or mode of an individual sensor. For example, the sensor module 220 may turn on a camera, receive image frames from the camera, time stamp those image frames, and store the image frames in data storage area 140 (e.g., so that the image frames can be used by the navigation module 230 and/or the landing module 240), and then instruct the camera to go into standby mode.

The navigation module 230 is configured to navigate the aircraft during flight. The navigate module 230 is also configured to navigate the aircraft to and from the mobile structure and mobile landing area. In one embodiment, the navigation module 230 is configured to determine the direction the aircraft should move in three dimensional space and when the aircraft should move and how the aircraft should move. Advantageously, the navigation module 230 is configured to use predetermined coordinates and GNSS information. However, the navigation module 230 may also use other means of navigation as will be understood by those skilled in the art. At the end of a mission and prior to landing, the navigation module 230 is configured to navigate the aircraft to intercept the mobile structure. In one embodiment, the navigation module is configured to cooperate with the flight module 200 to cause the aircraft to fly in the desired direction and fly to the desired location, for example when the aircraft is returning to the mobile structure at the end of a mission.

The landing module 240 is configured to execute a landing maneuver and bring the aircraft into contact with a surface of the mobile landing area. The landing module 240 is configured to control and execute the landing maneuver in cooperation with the flight module 200. In one embodiment, the landing module 240 is configured to obtain data from data storage area 140 or to receive sensed information directly from the sensor system 130 or from the sensor module 220 and process the data, run algorithms on the data, perform calculations on the data and control and operate the lift system 110 in order to cause the aircraft to move in such a way that it lands at the mobile landing area at a predetermined time. For example, in one embodiment, the landing module 240 obtains image data (e.g., a single image file or plural image files) stored in the data storage area 140, performs image processing algorithms on the images to determine the location of the mobile landing area relative to the aircraft and to determine how the aircraft needs to move in order to reach the mobile landing area and cooperate with the flight module 200 to send instructions to the lift system to cause the aircraft to move in the desired direction and hover over the mobile landing area.

The landing module 240 is further configured to estimate an attitude of the surface of the mobile landing area. More specifically, the landing module 240 is configured to calculate the attitude of the surface of the mobile landing area with respect to the aircraft and/or horizon based on sensor data. The landing module 240 periodically or substantially continuously calculates the attitude of the surface of the mobile landing area with respect to the aircraft and/or horizon based on sensor data and in accordance with these calculations the landing module 240 estimates a future attitude of the surface of the mobile landing area. Advantageously, the landing module 240 is configured to estimate the time range for a quiescent period for the surface of the mobile landing area, wherein the quiescent period is the interval of time where all mobile landing structure motions are within acceptable limits for performing a desired activity, such as landing the unmanned aircraft on the surface of the mobile landing area.

Finally, the landing module 240 is configured to determine a landing time within the time range of the quiescent period and calculate a landing initiation time at which the aircraft 20 will initiate its landing maneuver. In one embodiment, the landing time is determined to be within the first third of the time range for the quiescent period. In an alternative embodiment, the landing time is determined to be within the first half of the time range for the quiescent period. In an alternative embodiment, the landing time is determined to be within the middle third of the time range for the quiescent period. In an alternative embodiment, the landing time is determined to be within the second half of the time range for the quiescent period. Advantageously, at the landing initiation time, the landing module 240 is configured to alter the amount of power being delivered to the individual lift mechanisms 150 of the lift system 110 to cause the aircraft 20 to descend. The landing module 240 is configured to control the speed of the descent by varying (e.g., increasing or decreasing) the amount of power delivered to each individual lift mechanism 150 of the lift system 110. At some time after the aircraft begins to descend, the aircraft will contact the surface of the landing area.

Figure 4:
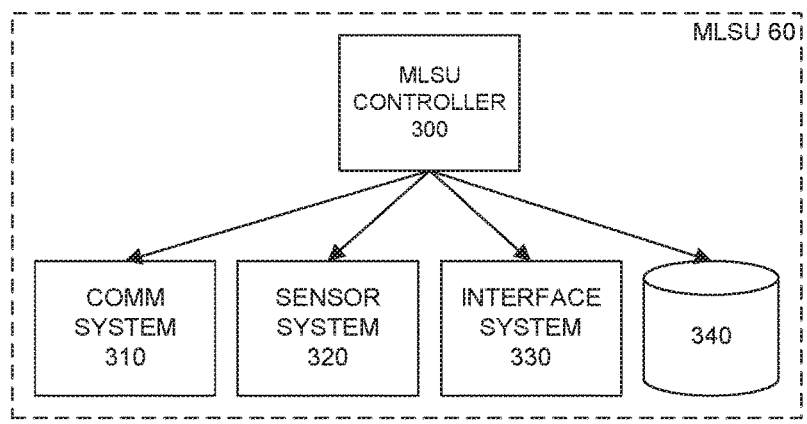
FIG. 4 is a block diagram illustrating an example mobile landing structure unit according to an embodiment of the invention.

FIG. 4 is a block diagram illustrating an example mobile landing structure unit 60 according to an embodiment of the invention. In the illustrated embodiment, the MLSU 60 comprises an MLSU controller 300, a communication system 310, a sensor system 320, an interface system 330 and a data storage area 340.

The MLSU controller 300 is a processor device that is configured to execute instructions to control operation of the MLSU 60. The instructions may be dynamically received, stored in the data storage area 340 or they may be integral to the controller 300. In operation, the controller 300 is configured to control operation of the communication system 310 for wired or wireless communication between the MLSU 60 and the aircraft 20 and other devices. The controller 300 is also configured to control operation of the sensor system 320 to receive information about the environment of the mobile landing structure 30 and the mobile landing area 40. The controller 300 is also configured to control operation of the interface system 330 to provide local and/or remote input and output to the MLSU 60. The controller 300 is also configured to control operation of the data storage area 340 to access information stored therein and to store information therein.

The MLSU communication system 310 is configured to allow wired and wireless communication between the MLSU 60 and the aircraft 20 and other devices. In one embodiment, the MLSU communication system 310 includes one or more antennas, transmitters, receivers, cables, wires and other equipment such as radios that may be necessary or desired for the MLSU 60 to communicate with the aircraft 20 and other devices. For example, the MLSU 60 can communicate wirelessly with the aircraft 20 during flight and the MLSU 60 can communicate with other devices wirelessly. When the aircraft 20 is not in flight, the communication system 310 may include a physical connection port to allow the communication system 310 to communicate with the aircraft 20 over a wired connection. In one embodiment, the MLSU communication system 310 may include radios for data transmission to the aircraft 20, a GNSS receiver, a satellite communication radio, and a connection to a mobile structure's ultra-high frequency ("UHF") radio.

In one embodiment, the communication system 310 also communicates with other devices such as laptops and other computing devices either via a wired or wireless connection. For example, a computer device (not shown) may be located within the captain's office on a mobile landing structure that happens to be a commercial fishing vessel. Advantageously, the communication system 310 may be communicatively coupled with the computer device via a wired or wireless connection. Additionally, the MLSU 60 may include one or more input/output devices such as a mouse, keyboard and monitor and the communication system 310 is configured to receive input from and send output to such input/output devices. Moreover, the communication system 310 is also configured to communicate with the controller 300 to allow the controller 100 to transmit and receive data to and from other devices that are in communication range of the MLSU 60.

The MLSU sensor system 320 is configured to sense information related to the environment of the MLSU 60, which is advantageously located on the mobile landing structure 30 near the mobile landing area 40. In one embodiment, the sensor system 320 comprises one or more sensors positioned at any location within or on the MLSU 60. For example, the sensors may include one or more of each of optical and infrared cameras, range-finders, inertial measurement units (IMUs), accelerometers, anemometers, pressure sensors, magnetometers, and compasses, just to name a few. Advantageously, the individual sensors may be co-located or dispersed around the MLSU 60. The individual sensors advantageously sense information and may directly store the information as data in the data storage area 340. Additionally, the sensor system 320 is configured to communicate with the MLSU controller 300 to allow the MLSU controller 300 to operate individual sensors and receive and process sensed information and store the sensed information as data in the data storage area 340. The sensor system 320 is also configured to allow the addition of new sensors and the removal of existing sensors.

The MLSU interface system 330 is configured to provide data to and receive data from integrated and/or remote input devices and output devices. In one embodiment, the MLSU interface system 330 is the means for interfacing with the MLSU 60 from a device outside of the MLSU 60. In one embodiment, the MLSU interface system 330 comprises one or more human user interfaces (e.g., mouse, keyboard, monitor) as well as one or more machine-to-machine interface (e.g., an application programming interface). The MLSU interface system 330 advantageously is configured to provide data to a human interface or machine interface and is also configured to receive data from a human interface or machine interface. In one embodiment, the MLSU interface system 330 includes a touchscreen computer that displays information about the health and status of the aircraft 20 and also displays images and environmental data that the aircraft 20 is collecting. In the same or another embodiment, the interface system includes a series of LED lights that illuminate based on the charge state of the batteries included in the aircraft 20.

Figure 5:
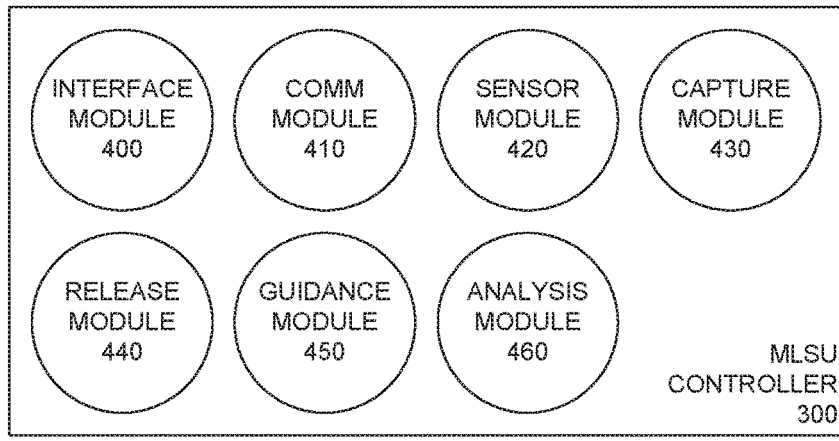
FIG. 5 is a block diagram illustrating an example controller in a mobile landing structure unit according to an embodiment of the invention.

FIG. 5 is a block diagram illustrating an example MLSU controller 300 in a mobile landing structure unit according to an embodiment of the invention. In the illustrated embodiment, the MLSU controller 300 comprises an interface module 400, a communication module 410, a sensor module 420, a capture module 430, a release module 440, a guidance module 450 and an analysis module 460. As previously described, the MLSU controller 300 is configured to store data in and obtain data from the data storage area 340. In various embodiments, the illustrated modules 400-460 can be implemented entirely in software or may be implemented entirely in hardware or may be implemented in a combination of hardware and software.

The interface module 400 is configured to operate the interface system 330. In the illustrated embodiment, the interface module 400 is configured to control the interface system 330. In one embodiment, the interface module 400 provides data in the proper format to one or more components of the interface system, for example one or more display monitors that may have different screen sizes and resolutions. The interface module 400 also receives data from one or more components of the interface system and manipulates and formats the data and stores the data in the data storage area 340 and/or provides the data directly to other modules. For example, interface module 400 may receive data from a keyboard entry device or a mouse/pointer entry device or a touchscreen entry device or any other type of entry device. The interface module 400 also provides a means for new interfaces to be integrated into the system 10. For example, the interface module 400 may allow a new keyboard to be added and subsequently, the interface module 400 receives keystroke data from the new keyboard and processes the keystroke data to identify commands and carry out instructions corresponding to those commands or provide the commands and/or related information to one or more other modules for processing by the one or more other modules.

The MLSU communication module 410 is configured to control and operate the various components of the MLSU communication system 310. The MLSU communication module 410 is configured to send data to the MLSU communication system 310 and is also configured to receive data from the MLSU communication system 310. The MLSU communication module 410 is also configured to process the received data directly or route the received data to an alternative module for processing or storing the received data in the data storage area 340. The MLSU communication module 410 is also configured to manipulate and package data, commands, and telemetry information so that such data, commands, and information is suitable to be transmitted or received or routed to another module. For example, the MLSU communication module 410 may turn on the satellite transceiver, download a software update and store it in data storage area 340, send a confirmation acknowledging receipt and then turn off the transceiver.

The MLSU sensor module 420 is configured to operate the MLSU sensor system 320. In one embodiment, the MLSU sensor module 420 is configured to receive data generated from information sensed by the individual sensors of the MLSU sensor system 320. Additionally, the MLSU sensor module 420 is configured to process the received data, manipulate the data, reformat the data, perform calculations using the data, and store the data and/or results of calculations on the data in the data storage area 340. The MLSU sensor module 420 is also configured to make the data available to other modules and systems as necessary, for example via the data storage area 340 or directly via data transfer from the MLSU sensor module 420 to the recipient module. The MLSU sensor module 420 is also configured to control the operation of the sensors, including adjusting the state of an individual sensor, for example by turning an individual sensor on or off, or by changing the function or mode of an individual sensor. For example, the MLSU sensor module 420 may turn on a camera, receive image frames from the camera, time stamp the received image frames, and store the image frames in data storage area 340 (e.g., so that the image frames can be used by the guidance module 450 and/or the analysis module 460), and then instruct the camera to go into standby mode.

The MLSU capture module 430 is configured to control operation of the capture mechanism 70 deployed near the mobile landing area 40 to secure the aircraft 20 to the surface of the mobile landing area 40. In one embodiment, the MLSU capture module 430 is configured to determine when to instruct the capture mechanism 70 to initiate capture, for example by extending an arm of the capture mechanism 70 to secure a foot of the aircraft 20 to the surface of the mobile landing area 40—or alternatively by extending a net of the capture mechanism 70 above the surface of the mobile landing area 40. The MLSU capture module 430 is also configured to send the capture instruction to the capture mechanism 70.

The MLSU release module 440 is configured to control operation of the capture mechanism 70 deployed near the mobile landing area 40 to release the aircraft 20 prior to takeoff from the mobile landing area 40. In one embodiment, the MLSU release module 440 is configured to determine when to instruct the capture mechanism 70 to initiate release, for example by retracting an arm of the capture mechanism 70 that is securing a foot of the aircraft 20 to the surface of the mobile landing area 40. The MLSU release module 440 is also configured to send the release instruction to the capture mechanism 70.

The MLSU guidance module 450 is configured to guide the aircraft 20 from a remote location back to the mobile structure. The MLSU guidance module 450 is configured to obtain sensor data from the data storage area 340 or from the sensor system 320 and analyze the data directly or in cooperation with the analysis module 460 and send instructions and data to the aircraft 20 via the communication module 410 or directly through the communication system 310. Advantageously, the instructions and data can be used by the aircraft 20 to return to the mobile structure 30 and more specifically to the mobile landing area 40. In one embodiment, the MLSU guidance module 450 is configured to determine how and when the aircraft 20 should move in any one or all directions. Advantageously, the MLSU guidance module 450 is configured to provide such guidance information to the aircraft 20 and is also configured to provide guidance signals that are conveyed directly to the aircraft 20.

The MLSU analysis module 460 is configured to obtain information and data directly from the various other modules or directly from the various other systems or from data storage area 340 and analyze such data and information. The types of mission segment analysis performed by the MLSU analysis module 460 include preflight, takeoff, en route, approach, landing and post flight. These mission segments collectively comprise all mission segments for the aircraft 20. As will be understood, the recited mission segments may be combined or separated into additional segments as appropriate for a particular type of mission. In one embodiment, the MLSU analysis module 460 obtains information and data collected from completed flights and stored in data storage area 340 and processes and/or analyzes the data. The MLSU analysis module 460 advantageously uses the data to provide information to operators regarding future flights and provides information to improve and optimize overall operation of the system and its constituent systems and modules. For example, the MLSU analysis module 460 is configured to provide information and reports that determine the efficiency of algorithms and ways to improve those algorithms.

Figure 6A:
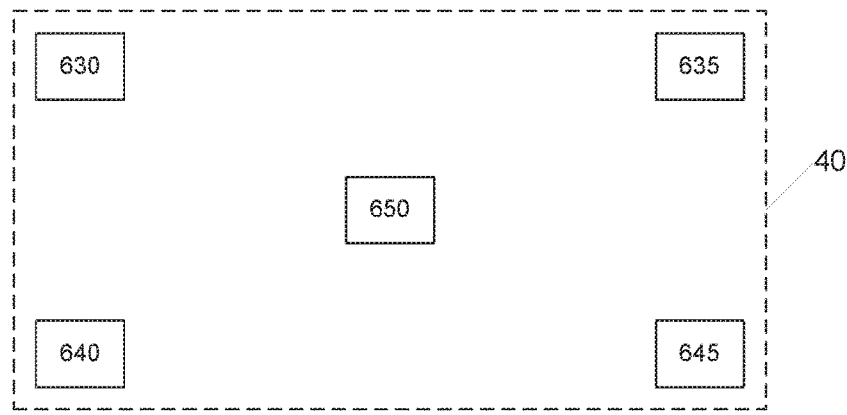
FIG. 6A is a block diagram illustrating an example wireless mobile landing area according to an embodiment of the invention.

FIG. 6A is a block diagram illustrating an example wireless mobile landing area 40 according to an embodiment of the invention. In the illustrated embodiment, the mobile landing area 40 comprises one or more guidance mechanisms 630, 635, 640, 645 and 650. The one or more guidance mechanism 630-650 can be any type of wireless spectrum indicator, for example, a radio frequency (RF) indicator, an infra-red (IR) indicator or some other type of wireless spectrum indicator that can be sensed by a sensor device on the aircraft 20. For example, the wireless spectrum indicator can be a radio frequency identifier (RFID) tag and the sensor device on the aircraft 20 can be an RFID tag reader. In one embodiment, plural (two or more) guidance mechanisms 630-645 are dispersed around the mobile landing area 40 to allow the aircraft 20 to identify the center of the mobile landing area 40. In an alternative embodiment a single guidance mechanism 650 is positioned at the center of the mobile landing area 40 to allow the aircraft 20 to identify the center of the mobile landing area 40.

In one embodiment, the aircraft 20 receives, calculates or otherwise determines the location of the center of the mobile landing area 40 and uses that location to calculate a vector and the aircraft 20 flies in the direction of the vector in order to approach the mobile landing area 40 or to maintain a constant position relative to the center of the mobile landing area 40 as the aircraft 20 hovers prior to executing its landing maneuver.

Figure 6B:
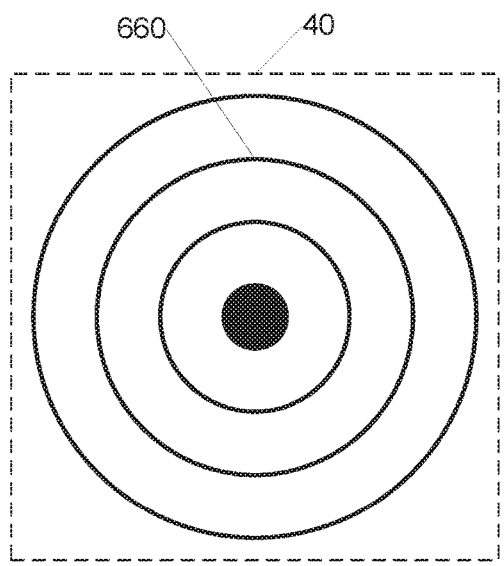
FIG. 6B is a block diagram illustrating an example target mobile landing area according to an embodiment of the invention.

FIG. 6B is a block diagram illustrating an example mobile landing area 40 having a visual target 660 according to an embodiment of the invention. In the illustrated embodiment, the visual target 660 manifests as a circular target, but it should be understood that any form of visual target that identifies the center of the mobile landing can be used. Advantageously, the visual target 660 can be imaged by a sensor device and the resulting image can be analyzed programmatically to identify the center of the target and correspondingly the center of mobile landing area, e.g., by analyzing shapes and contrast in the visual target 60.

Figure 6C:
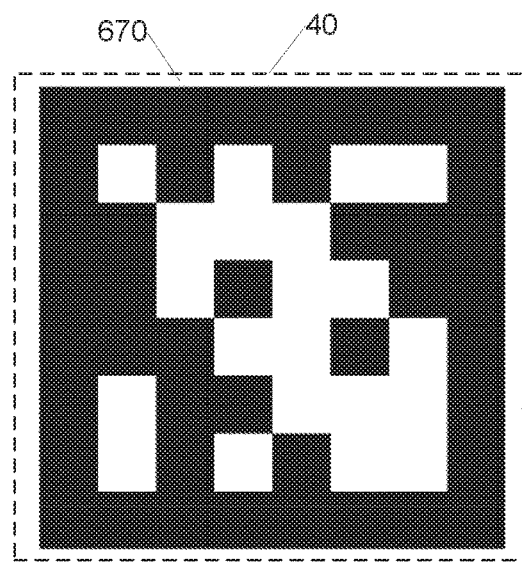
FIG. 6C is a block diagram illustrating an example coded mobile landing area according to an embodiment of the invention.

FIG. 6C is a block diagram illustrating an example mobile landing area 40 having a coded target 670 according to an embodiment of the invention. In the illustrated embodiment, coded target 670 has a known size and known features, including but not limited to high contrast areas and a series of parallel lines and shapes. Advantageously, a calibrated camera sensor onboard the aircraft 20 can capture serial images of the coded target 670 and an analysis of the serial images can be performed to determine estimations of the state of the aircraft relative to the mobile landing area 40. Based upon the known features and known size of the coded target 670, the aircraft is configured to determine the distance from the camera sensor to the coded target 670 in three dimensions and therefore determine the relative distance between the aircraft 20 and the mobile landing area 40.

Additionally, the aircraft 20, which hovers with an attitude substantially equal to the horizon, is configured to determine the relative attitude (e.g., a combination of roll, pitch and yaw) of the surface of the mobile landing area 40 based on the perspective of the parallel lines and relative size of the shapes within the coded target 670. Advantageously, the relative attitude information is timestamped with the time of the image capture and therefore analysis of serial timestamped attitude information for the surface of the mobile landing area 40 allows the aircraft to estimate a future attitude of the surface of the mobile landing area 40 and thereby determine a quiescent period.

For example, in one embodiment, the relative attitude (e.g., a combination of roll, pitch and yaw) information determines the state of the mobile landing area 40 at the time that the camera sensor captured the image. By analysis of successive images, the aircraft 20 is configured to determine a future state estimation for the surface of the mobile landing area 40 and identify a quiescent period appropriate for safe landing. The aircraft 20 is also configured to determine a time to initiate a landing maneuver to ensure that the aircraft 20 makes contact with the surface of the mobile landing area 40 during the identified quiescent period. Advantageously, the aircraft 20 may be configured to employ a proportional-integral-derivative ("PID") control loop feedback during execution of the landing maneuver.

In one embodiment, the quiescent period is a window of time and the aircraft 20 is configured to determine the time to initiate the landing maneuver such that the aircraft 20 makes contact with the surface of the mobile landing area 40 during the identified quiescent period. For example, the aircraft may determine a landing initiation time to cause the aircraft to land during the first third, first half, middle third, second half or final third of the quiescent period.

Figure 6D:
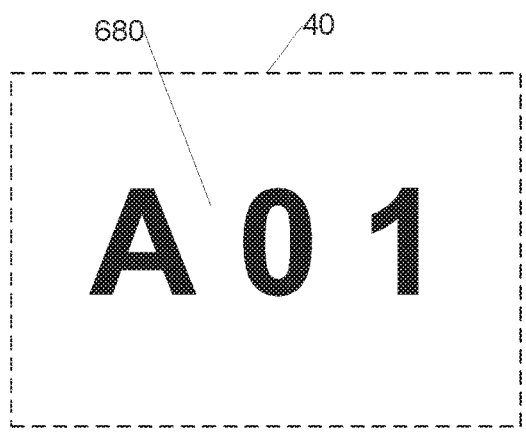
FIG. 6D is a block diagram illustrating an example coded mobile landing area according to an embodiment of the invention.
Figure 6E:
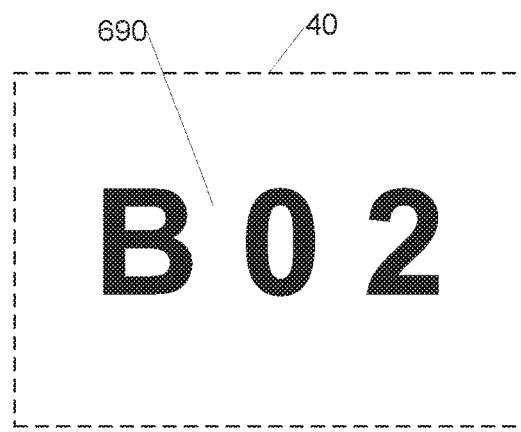
FIG. 6E is a block diagram illustrating an example coded mobile landing area according to an embodiment of the invention.

FIGS. 6D and 6E are block diagrams illustrating example mobile landing areas 40, each having a coded target 680 and 690 according to embodiments of the invention. In the illustrated embodiments, the coded targets 680 and 690 can be used when a plurality of unmanned aircraft 20 are being operated as a fleet from the same mobile structure 30. In such an embodiment, the mobile structure 30 includes a plurality of mobile landing areas 40 and each mobile landing area 40 can be distinguished by its coded target 680 and 690. As will be understood by those skilled in the art, a plurality of unique coded targets 670 previously described with respect to FIG. 6C could also be used to distinguish separate mobile landing areas 40 when operating plural aircraft 20 from a single mobile landing structure 30.

Figure 7:
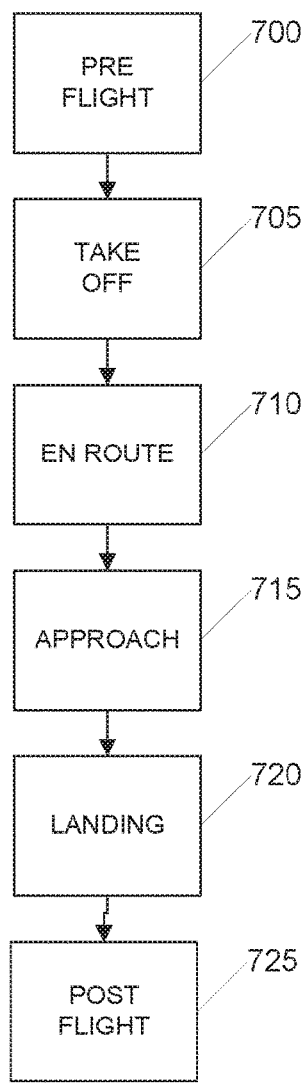
FIG. 7 is a flow diagram illustrating an example process for an unmanned aircraft mission according to an embodiment of the invention.

FIG. 7 is a flow diagram illustrating an example process for an unmanned aircraft mission according to an embodiment of the invention. In one embodiment, the process may be carried out independently by an unmanned aircraft as previously described with respect to FIGS. 1-3 and 10. In an alternative embodiment, the process may be carried out by a combination of an unmanned aircraft and an MLSU as previously described with respect to FIGS. 1-5 and 10.

Initially in step 700 the aircraft does a preflight procedure to ensure that conditions are within certain predetermined tolerances. For example, the aircraft may analyze sensor data to determine environmental conditions such as temperature, air pressure, barometric pressure, humidity, and the like and compare the sensor data to predetermined tolerance values to determine if flight is safe and/or acceptable under the environmental conditions. Additionally, the aircraft may analyze information stored in memory or provided by modules or systems integral to the aircraft to determine operational conditions such as battery level, lift system function, communication system function, sensor system function and the like. The operational conditions are also compared to predetermined tolerance values to determine if flight is safe and/or acceptable under the operational conditions and under the combination of operational conditions and environmental conditions.

Once the aircraft has successfully completed its preflight procedure, in step 705 the aircraft executes a takeoff maneuver and separates from physical contact with the mobile landing structure. Executing the takeoff maneuver will be later described in more detail with respect to FIG. 8. After the aircraft has completed its takeoff maneuver, in step 710 the aircraft performs the en route phase of its mission. In one embodiment, the aircraft determines that the en route phase of the mission is complete when it determines that the battery level of the aircraft has reached a predetermined threshold, which may vary based on the distance that the aircraft is from the mobile landing structure. Alternatively, the aircraft may determine the end of the en route phase of its mission by receiving a communication from the mobile landing structure instructing the aircraft to return. Additional triggers for determining the end of the en route phase of the mission may also be employed as will be understood by skilled artisans.

Once the en route phase of the mission has ended, the aircraft transitions into the approach phase as shown in step 715. In one embodiment, while in the approach phase the aircraft periodically calculates an approach vector and makes course corrections in accordance with the re-calculated approach vector to guide the aircraft to the mobile landing structure. The approach vector may be calculated continuously or periodically. In one embodiment, the frequency of approach vector calculation increases as the aircraft nears the mobile landing structure.

In one embodiment, calculation of the approach vector is based at least in part on data received by the aircraft from the MLSU. Alternatively, the MLSU may calculate the approach vector and send the approach vector to the aircraft. For example, the MLSU may calculate the approach vector based at least in part on data received from the aircraft. Advantageously, the aircraft's use of the approach vector for guidance allows the aircraft to propel itself back to the mobile landing structure and more specifically to the mobile landing area of the mobile landing structure. In one embodiment, the mobile landing area of the mobile landing structure may be a different location on the mobile landing structure than the location from which the aircraft executed its takeoff maneuver. Additionally, the mobile landing area to which the aircraft is guided may be a different mobile landing structure from which the aircraft executed its takeoff maneuver.

Once the aircraft is near the mobile landing area, the aircraft transitions into the landing phase of its mission, as shown in step 720. During the landing phase, the aircraft (by itself or in combination with the MLSU) identifies the center of the mobile landing area and continuously or periodically calculates a landing vector that is directed toward the center of the landing area. By following the landing vector, the aircraft is able to maintain a substantially constant relative (X,Y) position over the mobile landing area. Additionally during the landing phase, the aircraft (by itself or in combination with the MLSU) continuously or periodically calculates a distance between the aircraft and the surface of the mobile landing area. Although the aircraft maintains a constant attitude with respect to the horizon while hovering over the mobile landing area, the mobile landing structure is subject to heave, which is motion in (Z) that can be caused by waves or tides (e.g., the mobile landing structure travels on water), bumps or dips or hills (e.g., the mobile landing structure travels on land), or air pockets or changes in air pressure (e.g., the mobile landing structure travels through air). Accordingly, the aircraft (by itself or in combination with the MLSU) continuously or periodically estimates a future distance between the aircraft and the surface of the mobile landing area in order to maintain a substantially constant relative (Z) position over the mobile landing area.

Additionally, during the landing phase the aircraft (by itself or in combination with the MLSU) continuously or periodically estimates an attitude of the surface of the mobile landing area with respect to the aircraft and/or the horizon to determine the next quiescent period, which is a period of time when the roll, pitch and yaw motion of the surface of the mobile landing area are within predetermined tolerances and result in the surface of the mobile landing area being relatively level with respect to the aircraft and/or the horizon. The aircraft then executes a landing maneuver in order to bring the aircraft into contact with the surface of the mobile landing area during the predetermined quiescent period. Preferably, the aircraft lands during the first third of the quiescent period or during the first half of the quiescent period.

Finally, once the aircraft has contacted the surface of the mobile landing area, the aircraft (alone or in combination with the MLSU) executes its post flight procedure, as shown in step 725. In one embodiment, the post flight procedure includes securing the aircraft to the surface of the mobile landing area and transferring mission data stored in one or more data storage areas on the aircraft to the MLSU or other device. The post flight procedure may also include functional tests on the various modules and systems of the aircraft.

Figure 8:
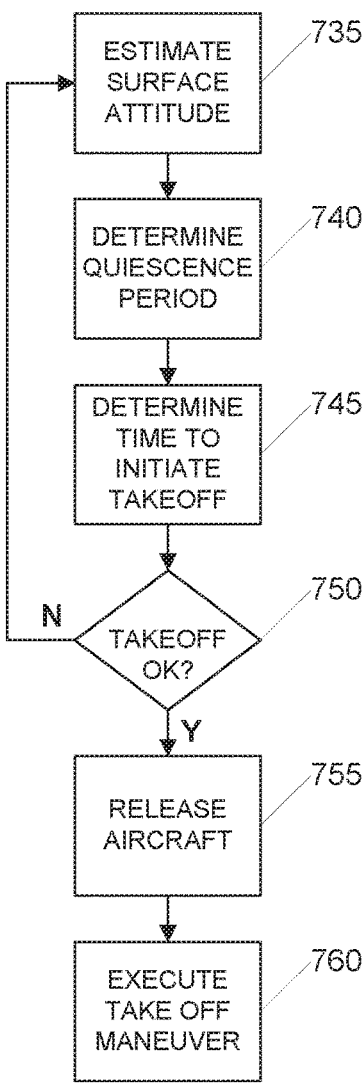
FIG. 8 is a flow diagram illustrating an example process for unmanned aircraft take off according to an embodiment of the invention.

FIG. 8 is a flow diagram illustrating an example process for unmanned aircraft take off according to an embodiment of the invention. In one embodiment, the process may be carried out independently by an unmanned aircraft as previously described with respect to FIGS. 1-3 and 10. In an alternative embodiment, the process may be carried out by a combination of an unmanned aircraft and an MLSU as previously described with respect to FIGS. 1-5 and 10.

Initially, in step 735 the attitude of the surface upon which the aircraft is positioned is estimated. The estimation can be calculated based on sensor data from one or more sensors in the aircraft or the MLSU or a combination of sensors in the aircraft and the MLSU. Next, in step 740 the quiescent period for the surface upon which the aircraft is positioned is estimated and a start time and an end time of the quiescent period is determined. Next, in step 745 an initiate takeoff time is determined based on the estimated start time and end time of the estimated quiescent period. For example, if it takes the aircraft 20 seconds to generate sufficient lift to takeoff and the quiescent period is estimated to be 5 seconds, then the initiate takeoff time may be determined to be 19 seconds before the estimated start time of the quiescent period. Advantageously, this permits the aircraft to takeoff within the first portion of the quiescent period.

Next, in step 750 an analysis of conditions is performed just prior to the initiate takeoff time to determine if it is okay for the aircraft to takeoff. Preferably, a preflight procedure has already been performed and in step 750 it is merely determined if there are any critical conditions that require aborting the takeoff. If it is determined that it is not okay to takeoff, takeoff is delayed and the process loops back to step 735 so that a new quiescent period and new initiate takeoff time can be estimated as previously described. If it is determined in step 750 that it is okay to takeoff, the aircraft is optionally released in step 755 if the aircraft happens to be secured to the surface of the mobile landing area as previously described. Preferably, the aircraft is released just prior to takeoff and in step 760 the aircraft executes its takeoff maneuver and separates from the mobile structure.

Figure 9:
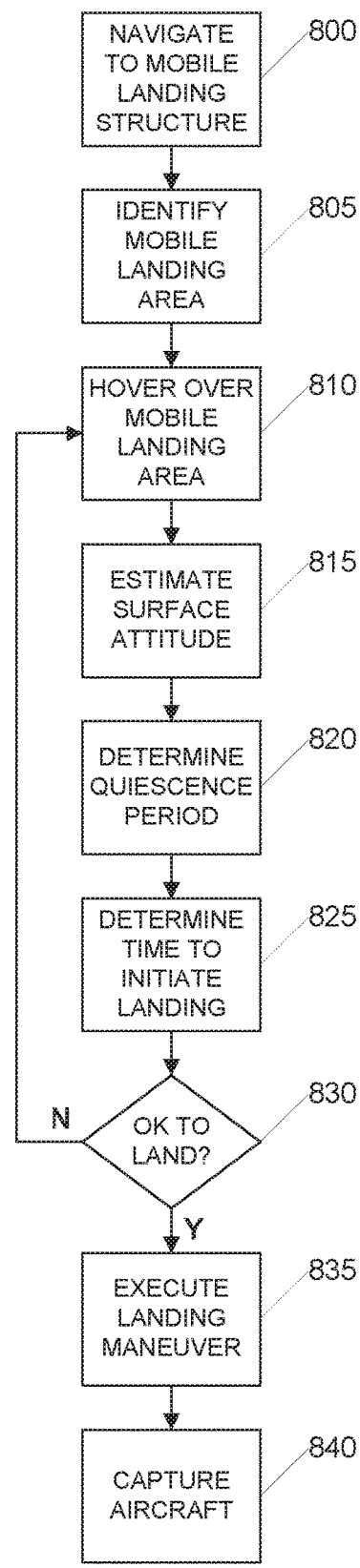
FIG. 9 is a flow diagram illustrating an example process for unmanned aircraft landing according to an embodiment of the invention.

FIG. 9 is a flow diagram illustrating an example process for unmanned aircraft landing according to an embodiment of the invention. In one embodiment, the process may be carried out independently by an unmanned aircraft as previously described with respect to FIGS. 1-3 and 10. In an alternative embodiment, the process may be carried out by a combination of an unmanned aircraft and an MLSU as previously described with respect to FIGS. 1-5 and 10.

Initially, in step 800 the aircraft navigates (by itself or in combination with the MLSU) to the mobile landing structure and more specifically to the mobile landing area, which is identified in step 805. Next, the aircraft hovers over the mobile landing area. As previously discussed, when the aircraft is hovering over the mobile landing area, the aircraft is maintaining a constant (X,Y) position relative to the center of the mobile landing area. Additionally, the aircraft is maintaining a substantially level attitude with respect to the horizon and the aircraft also maintains a constant (Z) position relative to the surface of the mobile landing area. Because the mobile structure is subject to heave and pitch, the surface of the mobile landing area may be moving up and down. Advantageously, the aircraft uses sensor data from the MLSU or from the aircraft to estimate (Z) movement of the surface of the mobile landing area and the aircraft instructs the lift system 110 accordingly to maintain a substantially constant (Z) position relative to the surface of the mobile landing area, while also maintaining a substantially level attitude with respect to the horizon.

Next, in step 815 the aircraft (alone or in combination with the MSLU) makes a series of estimates of the attitude of the surface of the mobile landing area over time. As previously discussed, the attitude of the surface of the mobile landing area is the combination of pitch, roll and yaw movement. Advantageously, oscillatory motion of the mobile structure has a period when the surface of the mobile landing area is substantially level with respect to the aircraft and/or the horizon; this time period is known as the quiescent period. To safely land an aircraft on a mobile structure with six axes of movement (X, Y, Z, roll, pitch, yaw), the optimal time to complete the landing maneuver is during this quiescent period. As will be understood by the skilled artisan, the X and Y variables are horizontal in nature while the Z variable is vertical in nature. Since the landing maneuver itself takes some amount of time to complete, the initiation of the landing maneuver will advantageously occur prior to the quiescent period. In step 820, the aircraft (alone or in combination with the MSLU) uses the series of estimates of the attitude of the surface of the mobile landing area over time to estimate a quiescent period and identifies a start time for the quiescent period and an end time for the quiescent period that are within predetermined tolerances for the anticipate maneuver to be performed. For example, the tolerances for a landing maneuver may be different from the tolerances for a takeoff maneuver. In one embodiment, the identification of the quiescent period may include quantifying motion in the several axes of motion and estimating the time period when those motions will be below some threshold value.

Accordingly, a prediction of an upcoming quiescent period or more specifically an estimate of the start time and end time of the upcoming quiescent period is made based on a series of state estimations for the attitude of the surface of the mobile landing area. The estimated start time of the quiescent period is then used in step 825 to determine the time to initiate the landing maneuver. Next, in step 830 a final check of conditions is performed to determine if any critical condition is present that would prevent landing. If such a critical condition is present, the landing process loops back to step 810 and the aircraft maintains its hover position over the mobile landing area and estimates a new series of surface attitudes and estimates a new quiescent period and a new time to initiate landing.

However, if such a critical condition is not present in step 830, the landing process continues and in step 835 the aircraft initiates executing the landing maneuver. After the landing maneuver is completed, or in parallel with the landing maneuver, the capture mechanism can be deployed to capture the aircraft, as shown in step 840.

The autonomous landing of an unmanned aircraft on a mobile structure is an extremely challenging process made even more difficult by real world environmental conditions such as pitch, roll, yaw, heave, wind, rain, and the like. Accordingly, detection and prediction of quiescence of the landing site is an important factor in determining the timing of landing of the aircraft. The aircraft (alone or in combination with the MLSU) estimates when quiescence will occur so that the aircraft lands during the quiescent period. The aircraft (alone or in combination with the MLSU) may determine and differentiate among plural quiescent periods. For example, the aircraft (alone or in combination with the MLSU) may differentiate between the quiescence that occurs when a vessel is at the trough of a wave and the quiescence that occurs when a vessel is at the crest of a wave. Furthermore, the aircraft (alone or in combination with the MLSU) may differentiate between quiescence when a vessel is in choppy waves and quiescence when a vessel is in rolling seas. Advantageously, the aircraft (alone or in combination with the MLSU) may estimate different start and stop times for these different quiescence.

In one embodiment, the state estimation of the surface of the mobile landing area and the determination of the quiescent period uses data collected from one or more sensors on the aircraft alone, on the MLSU alone, or on a combination of the aircraft and the MLSU. Sensors may include, but are not limited to: optical with any field of view (FOV) pointed in any direction, infrared with any FOV pointed in any direction, hyperspectral, multispectral, ultraviolet (UV), inertial including gyroscopes and accelerometers, RF, global navigation satellite system (GNSS), beacon, laser-based detection and ranging, RADAR, LIDAR, electric field, magnetic field, acoustic, timers, pressure including barometric altimeter, temperature, humidity, voltage, wind, and contact, just to name a few. Additional sensors may also be employed, as will be understood by those skilled in the art. As previously stated, one or more of these sensors, in various combinations, may be onboard the aircraft, on the MLSU, or in both locations.

In order to predict quiescence, and therefore the optimal time to initiate execution of the landing maneuver, the system must make an estimate of the attitude of the mobile landing area. The attitude is relative to the aircraft and/or the horizon and may include a combination of the pitch, roll and yaw of the surface of the mobile landing area. In one embodiment, because the attitude is relative to the horizon it is also relative to the aircraft, which maintains a substantially level position relative to the horizon when hovering over the mobile landing area. Additionally, the relative direction and distance of the aircraft to the mobile landing area is also estimated. In other words, the landing state includes both relative position (X, Y, Z) between the aircraft and the surface of the mobile landing area and relative attitude (pitch, roll, yaw) of the aircraft and the surface of the mobile landing area. A further consideration is heave, where the landing area moves up and down. While formally part of relative position, some embodiments may treat heave separately or in relation to the horizon in combination with pitch, roll and yaw in some or all stages of flight and/or landing.

Advantageously, the landing state estimation is used by the aircraft (alone or in combination with the MLSU) to determine the proper action for the aircraft to take when landing. For example, the aircraft moves through space to maintain a constant position in (X, Y, Z) relative to the mobile landing area and reduces power to the individual lift mechanisms of the lift system to cause the aircraft to descend and make contact with the surface of the mobile landing area during the quiescent period.

In one embodiment, when the aircraft is far from the landing area during approach, it will not adjust its own height to account for heaving of the mobile landing area. However, when the aircraft hovers above the mobile landing area, it is configured to do so within reasonable tolerances in (X, Y, Z) to maintain a substantially constant position relative to the mobile landing area in (X, Y, Z), even as the mobile structure moves. Furthermore, as the aircraft descends to the mobile landing area, it is configured to measure the vertical (Z) distance to the mobile landing area. However, as the aircraft gets closer to the mobile landing area, it may adjust its relative height (by increasing or decreasing power to the individual lift mechanisms 150 of the lift system 110) to account for the heave of the mobile structure as necessary to prevent collisions and execute a safe and controlled landing.

In another embodiment, the aircraft (alone or in combination with the MLSU) is configured to estimate the relative position and attitude states between the mobile structure and the aircraft. These estimates may incorporate GNSS and IMU information from both the MLSU and aircraft, as well as image-based relative position measurements from one or more cameras onboard the aircraft. An unscented Kalman filter (UKF) is configured to incorporate measurements to estimate the relative positions, velocities, angular positions, and angular rates for controlling the landing. A separate UKF is configured to predict the mobile landing area state for landing maneuver planning. The aircraft (alone or in combination with the MLSU) is also configured to plan the landing maneuver based on predictions of the mobile landing area position and attitude. The objective is to land the aircraft when the vertical motion of the mobile landing area is small and the landing area is substantially level.

In yet another embodiment, relative position is estimated through a GNSS system. The MLSU includes a GNSS receiver and transmits its position to the aircraft, which also has a GNSS receiver. The aircraft uses the MLSU position data and its own position to calculate the relative position. It may also use a real time kinematics (RTK) or differential GPS (DGPS) approach to achieve the same result with higher accuracy. Using this relative position information, the aircraft can then move to a location above the landing area. If the landing area is not co-located with the MLSU, an offset can be applied to the relative position. The aircraft is also equipped with a range finding sensor, e.g., acoustic or laser, to determine its height above the landing area. Rapidly sampling the sensor allows the determination of the height changes over time. A geometric target exists at the landing area. One or several cameras on the aircraft capture images of the target. The aircraft (alone or in combination with the MLSU) is configured to determine the center of the mobile landing area and position the aircraft directly above the mobile landing area with great accuracy. The aircraft then descends to the mobile landing area, continually moving to stay directly above it while determining its (Z) distance with the range finder and maintaining an appropriately controlled descent. The aircraft may also use image processing applied to the images of the mobile landing area along with range finding sensor data to determine the relative attitude of the mobile landing area. The aircraft (alone or in combination with the MLSU) is configured to use this information to estimate a time when the landing area is both directly beneath and level relative to the aircraft. The aircraft is configured to instruct the lift system to reduce power to one or more of the lift mechanisms (equally or individually) from a location above the landing area so that the aircraft executes a controlled drop and makes contact with the surface of the mobile landing area at the time that the surface of the mobile landing area is estimated to be substantially level (within reasonable tolerances) to ensure a safe and reliable landing.

Figure 10:
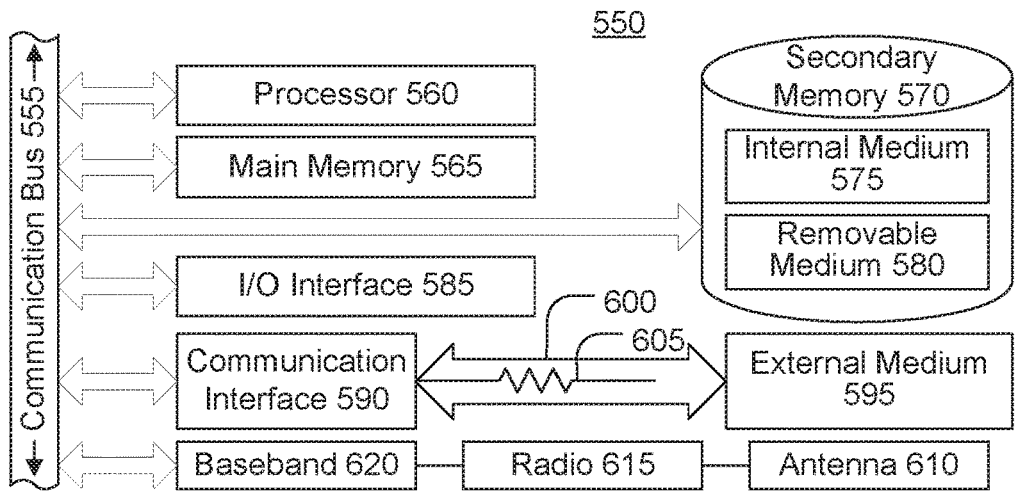
FIG. 10 is a block diagram illustrating an example wired or wireless processor enabled device that may be used in connection with various embodiments described herein.

FIG. 10 is a block diagram illustrating an example wired or wireless system 550 that may be used in connection with various embodiments described herein. For example the system 550 may be used as or in conjunction with an unmanned aircraft or a mobile landing structure unit as previously described with respect to FIGS. 1-5. The system 550 can be a conventional personal computer, computer server, personal digital assistant, smart phone, tablet computer, or any other processor enabled device that is capable of wired or wireless data communication. Other computer systems and/or architectures may be also used, as will be clear to those skilled in the art.

The system 550 preferably includes one or more processors, such as processor 560. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 560.

The processor 560 is preferably connected to a communication bus 555. The communication bus 555 may include a data channel for facilitating information transfer between storage and other peripheral components of the system 550. The communication bus 555 further may provide a set of signals used for communication with the processor 560, including a data bus, address bus, and control bus (not shown). The communication bus 555 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

System 550 preferably includes a main memory 565 and may also include a secondary memory 570. The main memory 565 provides storage of instructions and data for programs executing on the processor 560. The main memory 565 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 570 may optionally include a internal memory 575 and/or a removable medium 580, for example a floppy disk drive, a magnetic tape drive, a compact disc ("CD") drive, a digital versatile disc ("DVD") drive, etc. The removable medium 580 is read from and/or written to in a well-known manner. Removable storage medium 580 may be, for example, a floppy disk, magnetic tape, CD, DVD, SD card, etc.

The removable storage medium 580 is a non-transitory computer readable medium having stored thereon computer executable code (i.e., software) and/or data. The computer software or data stored on the removable storage medium 580 is read into the system 550 for execution by the processor 560.

In alternative embodiments, secondary memory 570 may include other similar means for allowing computer programs or other data or instructions to be loaded into the system 550. Such means may include, for example, an external storage medium 595 and an interface 570. Examples of external storage medium 595 may include an external hard disk drive or an external optical drive, or and external magneto-optical drive.

Other examples of secondary memory 570 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage media 580 and communication interface 590, which allow software and data to be transferred from an external medium 595 to the system 550.

System 550 may also include an input/output ("I/O") interface 585. The I/O interface 585 facilitates input from and output to external devices. For example the I/O interface 585 may receive input from a keyboard or mouse and may provide output to a display. The I/O interface 585 is capable of facilitating input from and output to various alternative types of human interface and machine interface devices alike.

System 550 may also include a communication interface 590. The communication interface 590 allows software and data to be transferred between system 550 and external devices (e.g. printers), networks, or information sources. For example, computer software or executable code may be transferred to system 550 from a network server via communication interface 590. Examples of communication interface 590 include a modem, a network interface card ("NIC"), a wireless data card, a communications port, a PCMCIA slot and card, an infrared interface, and an IEEE 1394 fire-wire, just to name a few.

Communication interface 590 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 590 are generally in the form of electrical communication signals 605. These signals 605 are preferably provided to communication interface 590 via a communication channel 600. In one embodiment, the communication channel 600 may be a wired or wireless network, or any variety of other communication links. Communication channel 600 carries signals 605 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 565 and/or the secondary memory 570. Computer programs can also be received via communication interface 590 and stored in the main memory 565 and/or the secondary memory 570. Such computer programs, when executed, enable the system 550 to perform the various functions of the present invention as previously described.

In this description, the term "computer readable medium" is used to refer to any non-transitory computer readable storage media used to provide computer executable code (e.g., software and computer programs) to the system 550. Examples of these media include main memory 565, secondary memory 570 (including internal memory 575, removable medium 580, and external storage medium 595), and any peripheral device communicatively coupled with communication interface 590 (including a network information server or other network device). These non-transitory computer readable mediums are means for providing executable code, programming instructions, and software to the system 550.

In an embodiment that is implemented using software, the software may be stored on a computer readable medium and loaded into the system 550 by way of removable medium 580, I/O interface 585, or communication interface 590. In such an embodiment, the software is loaded into the system 550 in the form of electrical communication signals 605. The software, when executed by the processor 560, preferably causes the processor 560 to perform the inventive features and functions previously described herein.

The system 550 also includes optional wireless communication components that facilitate wireless communication over a voice and over a data network. The wireless communication components comprise an antenna system 610, a radio system 615 and a baseband system 620. In the system 550, radio frequency ("RF") signals are transmitted and received over the air by the antenna system 610 under the management of the radio system 615.

In one embodiment, the antenna system 610 may comprise one or more antennae and one or more multiplexors (not shown) that perform a switching function to provide the antenna system 610 with transmit and receive signal paths. In the receive path, received RF signals can be coupled from a multiplexor to a low noise amplifier (not shown) that amplifies the received RF signal and sends the amplified signal to the radio system 615.

In alternative embodiments, the radio system 615 may comprise one or more radios that are configured to communicate over various frequencies. In one embodiment, the radio system 615 may combine a demodulator (not shown) and modulator (not shown) in one integrated circuit ("IC"). The demodulator and modulator can also be separate components. In the incoming path, the demodulator strips away the RF carrier signal leaving a baseband receive audio signal, which is sent from the radio system 615 to the baseband system 620.

If the received signal contains audio information, then baseband system 620 decodes the signal and converts it to an analog signal. Then the signal is amplified and sent to a speaker. The baseband system 620 also receives analog audio signals from a microphone. These analog audio signals are converted to digital signals and encoded by the baseband system 620. The baseband system 620 also codes the digital signals for transmission and generates a baseband transmit audio signal that is routed to the modulator portion of the radio system 615. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 610 where the signal is switched to the antenna port for transmission.

The baseband system 620 is also communicatively coupled with the processor 560. The central processing unit 560 has access to data storage areas 565 and 570. The central processing unit 560 is preferably configured to execute instructions (i.e., computer programs or software) that can be stored in the memory 565 or the secondary memory 570. Computer programs can also be received from the baseband processor 610 and stored in the data storage area 565 or in secondary memory 570, or executed upon receipt. Such computer programs, when executed, enable the system 550 to perform the various functions of the present invention as previously described. For example, data storage areas 565 may include various software modules (not shown) that are executable by processor 560.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. An unmanned aircraft system comprising:
    a non-transitory computer-readable medium configured to store information and executable programmed modules comprising a landing module;
    an unmanned aircraft comprising a lift system comprising one or more lift mechanisms configured to propel the unmanned aircraft;
    a mobile landing structure having a mobile landing area, wherein the mobile landing area comprises a visual target indicative of a center of a surface of the mobile landing area, wherein the visual target is a coded visual target comprising a known size and known features that uniquely identify the mobile landing area and the mobile landing structure;
    a sensor system configured to sense a sensed information related to an environment of the unmanned aircraft and send the sensed information to the non-transitory computer-readable medium; and
    a processor configured to control the lift system and the sensor system, the processor communicatively coupled with the non-transitory computer-readable medium and configured to execute programmed modules stored therein;
    wherein the landing module is configured to:
        receive the sensed information, wherein the sensed information comprises image data of the visual target;
        identify the mobile landing area on the mobile landing structure based on the sensed information, wherein the identifying comprises performing visual recognition of the image data of the visual target, wherein performing the visual recognition comprises performing image processing algorithms on the image data to determine a position of the unmanned aircraft relative to the mobile landing area;
        substantially continuously estimate a future position, a future movement, and a future attitude of the mobile landing area on the mobile landing structure, wherein the estimating comprises performing visual recognition of the image data of the visual target, wherein performing the visual recognition comprises performing image processing algorithms on the image data;
        identify a landing time corresponding to a desired future attitude of the mobile landing area; and
        maintain the unmanned aircraft in a substantially constant position relative to the center of the surface of the mobile landing area based on the estimated future position, the estimated future movement, and the estimated future attitude of the mobile landing area on the mobile landing structure; and
    wherein the processor is further configured to alter an amount of power delivered to the one or more lift mechanisms at a predetermined time to bring the unmanned aircraft into contact with the surface of the mobile landing area.

2. The system of claim 1, wherein the landing module is further configured to estimate a quiescent period having a start time and an end time based on the sensed information.

3. The system of claim 2, wherein the landing module is further configured to identify a landing initiation time, wherein the processor is further configured to control the lift system at the landing initiation time, and wherein the unmanned aircraft makes contact with the surface of the mobile landing area during the quiescent period.

4. The system of claim 3, wherein the unmanned aircraft makes contact with the surface of the mobile landing area during the first half of the quiescent period.

5. The system of claim 1, wherein the processor is further configured to control an amount of power delivered to each of the one or more lift mechanisms.

6. The system of claim 1, wherein the unmanned aircraft comprises one or more landing feet configured to engage the mobile landing area on the mobile landing structure.

7. The system of claim 1, wherein the coded visual target comprises one or more known features selected from: an area of high contrast, a set of parallel lines, a set of shapes, and a set of alphanumeric characters.

8. The system of claim 7, wherein the coded visual target comprises two or more known features selected from: an area of high contrast, a set of parallel lines, a set of shapes, and a set of alphanumeric characters.

9. The system of claim 1, wherein the mobile landing area further comprises one or more wireless guidance mechanisms configured to be sensed by the sensor system.

10. The system of claim 1, wherein the mobile landing structure comprises a mobile landing structure unit (MLSU), the MLSU comprising:
    an MLSU non-transitory computer-readable medium configured to store information and executable programmed modules comprising an MLSU guidance module;
    an MLSU sensor system configured to sense information related to an environment of the MLSU and the mobile landing structure, and send the sensed information to the MLSU non-transitory computer-readable medium;
    an MLSU communication system configured to communicate with the unmanned aircraft;
    an MLSU processor configured to control the MLSU sensor system and the MLSU communication system, the MLSU processor communicatively coupled with the non-transitory computer-readable medium;
wherein the MLSU guidance module is configured to:
receive a position information comprising a position of the mobile landing structure and a position of the unmanned aircraft; and
generate an approach vector based on the position information; and
wherein the processor is further configured to periodically or substantially continuously send the approach vector to the unmanned aircraft to guide the unmanned aircraft to the mobile landing structure.

11. The system of claim 10, wherein the mobile landing structure further comprises a capture mechanism positioned proximal to the mobile landing area, the capture mechanism configured to secure the unmanned aircraft to the mobile landing area, and wherein the MLSU non-transitory computer-readable medium further comprises a capture module configured to control the capture mechanism to secure the unmanned aircraft to the mobile landing area.

12. The system of claim 11, wherein the MLSU non-transitory computer-readable medium further comprises a release module configured to control the capture mechanism to release the unmanned aircraft from the capture mechanism.

13. The system of claim 11, wherein the mobile landing structure comprises at least one of a water vessel, a land vehicle, and an air vehicle.

14. The system of claim 1, wherein the substantially constant position relative to the center of the surface of the mobile landing area is a substantially constant relative (X, Y) or relative (Z) position over the center of the surface of the mobile landing area.

15. The system of claim 14, wherein the substantially constant position relative to the center of the surface of the mobile landing area is a substantially constant relative (X, Y) position over the center of the surface of the mobile landing area.

16. The system of claim 15, wherein the landing module is further configured to substantially continuously calculate a landing vector that is directed toward the center of the surface of the mobile landing area.

17. The system of claim 14, wherein the substantially constant position relative to the center of the surface of the mobile landing area is a substantially constant relative (Z) position over the center of the surface of the mobile landing area.

18. The system of claim 17, wherein the landing module is further configured to substantially continuously estimate a future distance between the unmanned aircraft and the surface of the mobile landing area.

19. The system of claim 14, wherein the substantially constant position relative to the center of the surface of the mobile landing area is a substantially constant relative (X, Y) and relative (Z) position over the center of the surface of the mobile landing area.

20. The system of claim 1, wherein the landing module is further configured to maintain the unmanned aircraft at a substantially constant attitude relative to the surface of the mobile landing area.

21. The system of claim 20, wherein the landing module is further configured to substantially continuously estimate a relative attitude between the unmanned aircraft and the surface of the mobile landing area.

22. A non-transitory computer-readable medium having stored thereon one or more executable instructions for navigating an unmanned aircraft having a lift system to a mobile landing structure, the executable instructions comprising instructions for:
identifying a mobile landing area on the mobile landing structure based on a sensed information related to an environment of the unmanned aircraft, wherein the sensed information comprises image data of a visual target indicative of a center of a surface of the mobile landing area, wherein the visual target is a coded visual target comprising a known size and known features that uniquely identify the mobile landing area and the mobile landing structure, wherein the identifying comprises performing visual recognition of the image data of the visual target, wherein performing the visual recognition comprises performing image processing algorithms on the image data to determine a position of the unmanned aircraft relative to the mobile landing area;
substantially continuously estimating a future position, a future movement, and a future attitude of the mobile landing area on the mobile landing structure, wherein the estimating comprises performing visual recognition of the image data of the visual target, wherein performing the visual recognition comprises performing image processing algorithms on the image data;
determining a quiescent period of the mobile landing area corresponding to a desired future attitude of the mobile landing area, the quiescent period comprising a future start time and a future end time;
determining an initiate landing time prior to the future start time;
maintaining the unmanned aircraft in a substantially constant position relative to the center of the surface of the mobile landing area based on the estimated future position, the estimated future movement, and the estimated future attitude of the mobile landing area on the mobile landing structure; and
controlling an amount of power delivered to the lift system at the initiate landing time to bring the unmanned aircraft into contact with the surface of the mobile landing area.

23. The non-transitory computer-readable medium of claim 22, wherein the executable instructions further comprise instructions for controlling a capture mechanism of the mobile landing structure to secure the unmanned aircraft to the mobile landing area after the unmanned aircraft makes contact with the surface of the mobile landing area.

24. The non-transitory computer-readable medium of claim 22, wherein the executable instructions further comprise instructions for periodically or substantially continuously generating an approach vector based on at least one of a position of the unmanned aircraft and a position of the mobile landing structure.

25. The non-transitory computer-readable medium of claim 22, wherein identifying the mobile landing area on the mobile landing structure comprises capturing, by a sensor on the unmanned aircraft, an image of the mobile landing area.

26. The non-transitory computer-readable medium of claim 25, wherein identifying the mobile landing area on the mobile landing structure comprises comparing the captured image of the mobile landing area to a predetermined image of the mobile landing area.

27. The non-transitory computer-readable medium of claim 22, wherein the coded visual target comprises one or more known features selected from: an area of high contrast, a set of parallel lines, a set of shapes, and a set of alphanumeric characters.

28. The non-transitory computer-readable medium of claim 27, wherein the coded visual target comprises two or more known features selected from: an area of high contrast, a set of parallel lines, a set of shapes, and a set of alphanumeric characters.

* * * * *